United States Patent [19]
Close

[11] 3,890,003
[45] June 17, 1975

[54] FREE PULL RETRACTOR

[75] Inventor: Albert R. Close, Sylmar, Calif.

[73] Assignee: American Safety Equipment Corporation, New York, N.Y.

[22] Filed: May 9, 1974

[21] Appl. No.: 468,431

[52] U.S. Cl.......... 297/388; 200/61.58 B; 242/107.4
[51] Int. Cl.... A62b 35/00; B65h 75/48; H01h 3/16
[58] Field of Search................... 297/388, 389, 385; 280/150 SB; 242/107.4, 107 R, 107.12; 200/61.58 B

[56] References Cited
UNITED STATES PATENTS

| | | | |
|---|---|---|---|
| 3,185,246 | 5/1965 | Maurer | 200/61.58 B |
| 3,308,902 | 3/1967 | Carter | 200/61.58 B |
| 3,519,771 | 7/1970 | Burns | 200/61.58 B |
| 3,632,059 | 1/1972 | Loose | 200/61.58 B |
| 3,689,881 | 9/1972 | Havashi | 200/61.58 B |
| 3,756,339 | 9/1973 | Cornelison | 200/61.58 B |
| 3,767,134 | 10/1973 | Morales | 200/61.58 B |
| 3,825,205 | 7/1974 | Takada | 200/61.58 B |

Primary Examiner—James T. McCall
Attorney, Agent, or Firm—Miketta, Glenny, Poms & Smith

[57] ABSTRACT

A safety belt assembly includes a safety belt, associated connectable buckle parts, and a belt retractor having a belt wind-up reel, a reel locking pawl and a pawl blocking member which is movable from a blocking position whereby it prevents the reel locking pawl from locking the reel against belt protraction to a pawl release position by slight retractive movement of the reel. An electrical system is provided which contains an electromagnet associated with the retractor for holding the pawl blocking member against movement to its pawl release position while the electromagnet is energized. The electromagnet is energized upon an initial protractive movement of the belt and is de-energized upon connection of the buckle parts. The electrical circuit includes a normally opened switch associated with the retractor which is closed by the initial protractive movement of the reel, and the circuit also includes a normally closed switch associated with the buckle parts which is opened on connection with the buckle parts.

10 Claims, 11 Drawing Figures

FREE PULL RETRACTOR

BACKGROUND OF THE INVENTION

All new cars and trucks sold today are required to have seat belts to protect the occupants in case of a crash. Federal regulations require that vehicles be equipped with an interlock system which requires that the occupants wear their seat belts prior to being able to start the automobile engine. Such interlock systems use logic circuits which sense that the seat belt is buckled subsequent to the seat becoming occupied, and only if buckling occurs after seat occupancy does the logic circuit allow the engine to be started.

Federal regulations also require a shoulder belt and lap belt combination system. Typically, the shoulder belt and lap belt are mounted on retractors and the belts are pulled therefrom when they are desired to be used. Normally, the shoulder belt is intended to be free pulling, that is, even when the shoulder and lap belt are connected to a receiving buckle or belt, the shoulder belt is free to be pulled from its reel so that the passenger or driver is free to lean forward from his sitting position. The shoulder retractor is sensitive either to sudden pulls on the belt, to sudden deceleration of the vehicle, or to both in order to sense a crash or sudden deceleration to the passenger to lock the shoulder belt and prevent the passenger or driver from falling forward into the wheel or dashboard.

The lap belt is usually attached to a second retractor. The reel usually has a mechanism which allows the belt to be pulled freely from the reel until the belt is allowed to retract a small distance back on the reel. The small retraction causes a locking member to lock the reel and prevent further protraction of the belt from the reel. Usually, the slight retraction occurs when the seat belt system is buckled and the excess belt is allowed to retract on the reel. Such a system is discussed in U.S. Pat. No. 3,174,704 to Replogle. Because the reel is sensitive to slight retraction of the belt, a slight release of the belt while pulling it from the reel causes the reel to lock so that the belt cannot be pulled to its full length and buckled. When that occurs, the belt must be retracted all the way back on the reel to release the locking mechanism, and thereafter the user must pull the belt out again so that the buckle can be connected.

The above disadvantage is very bothersome because it may be very time consuming to make two or three attempts to attach the belt. Any annoyance discourages use of the seat belts Even with the interlock system forcing use of the seat belts, it is advantageous to have voluntary rather than coercive use of the seat belt system.

Some of the problems have been overcome by prior disclosures, and the instant device utilizes some of the prior art teachings. In common with the prior art, especially as taught by Wohlert in U.S. Pat. No. 3,412,952, the device comprises a reel which is provided for winding seat belt webbing therearound. A reel locking pawl is movable between a first position to permit unreeling of the webbing and to a second position where the locking pawl prevents unreeling. Blocking means associated with the reel moves between a blocking position to prevent the locking pawl from moving to its second position and an inactive position permitting the locking pawl moving to its second position.

Therefore, it is an object of this invention to provide a seat belt system which overcomes the difficulties of the prior art. A specific object of the invention is the provision of having a free pull retractor so that the seat belt is free to be pulled from the reel, released back on the reel and yet free to be pulled further from the reel at least until the buckle is connected. A further object of the invention is to provide a switch system for a seat belt which indicates to the interlock or warning system that the belt has been protracted from the reel. It is still a further object of the invention to combine the warning or interlocking switching system in a circuit with the free pull feature so that fewer electrical circuit parts are needed. Another object of the invention is to meet the other objects with a low cost system that is very reliable. These and other objects will become evident from the foregoing description of the invention.

SUMMARY OF THE INVENTION

Electrically operated means is provided for holding the pawl blocking means in its blocking position which is actuated on protraction of the seat belt webbing and allows the reel to be freely reeled in and out until the belt is buckled. The electrically operated means releases the blocking means when the seat belt is buckled to allow the locking pawl to thereafter prevent unreeling of the reel. The electrically operated means may preferably comprise an electromagnet which holds the blocking means in its blocking position on activation of the electromagnet but which releases the blocking means when it is deactivated. A normally open switch is provided in association with the reel which closes on initial unreeling of the belt to activate the electromagnet. A normally closed switch in the buckle opens when the buckle parts are buckled to deactivate the electromagnet. The blocking means is preferably a blocking disc, rotatably mounted in association with the reel means such that protractive rotation of the reel urges the blocking disc into its blocking position. The blocking position is adjacent the electromagnet so that when the electromagent is activated, it will hold the blocking disc against itself. The poles of the electromagnet may extend from the magnetic coil to contact parts of the blocking disc so that the magnetic force from both poles may be utilized.

DETAILED DESCRIPTION OF THE PREFERRED EMBODIMENT

Figures 1, 9, 10, 11:
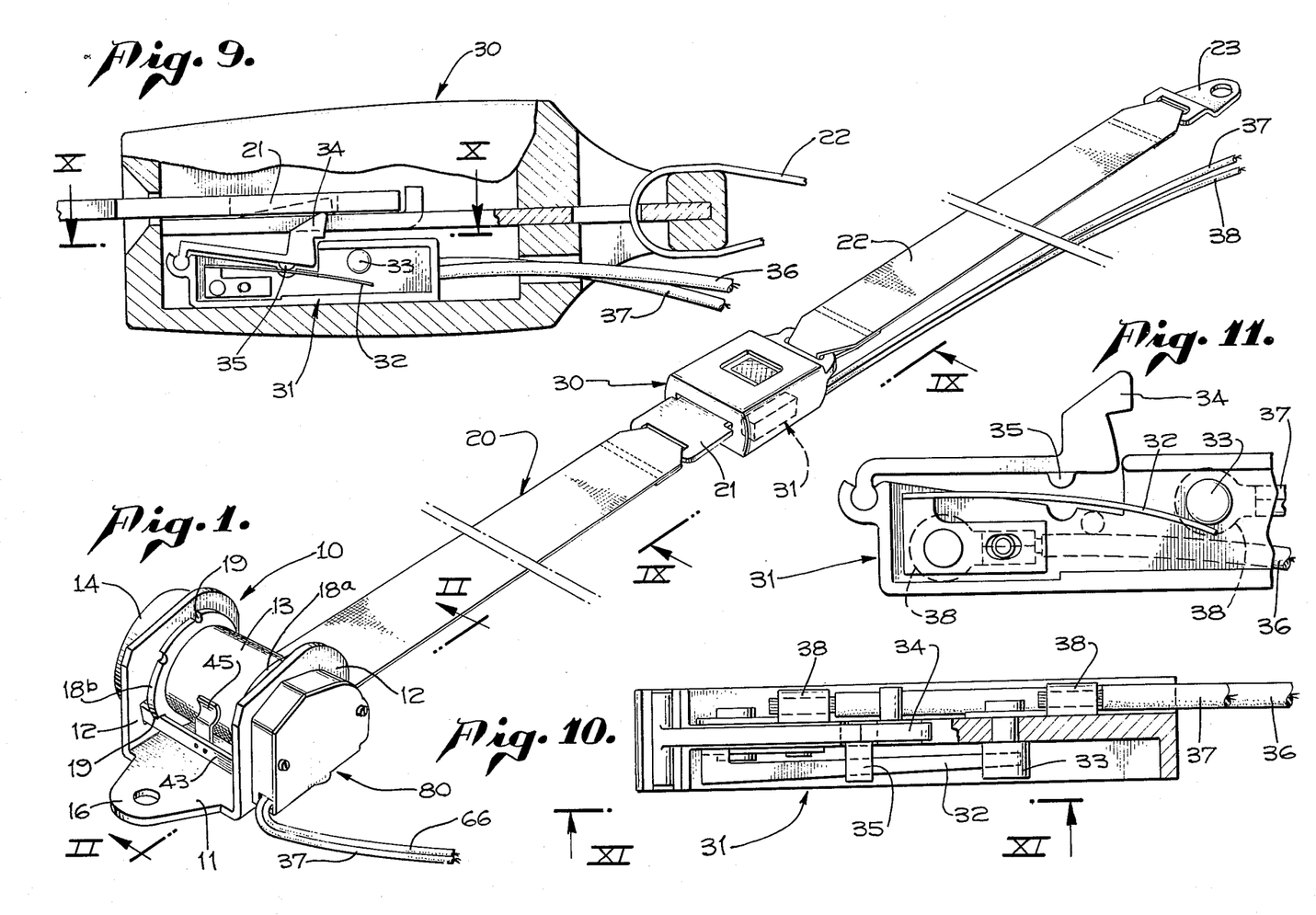
FIG. 1 shows the preferred exemplary embodiment of the Free Pull Retractor of the exemplary seat belt-reel combination.
FIG. 9 is a cross-sectional view of the preferred embodiment of the buckle associated with the Free Pull Retractor taken along plane IX—IX of FIG. 1.
FIG. 10 is a cross-sectional view of the buckle taken along plane X—X of FIG. 9.
FIG. 11 is a cross-sectional view of the normally closed switch in the buckle of the Free Pull Retractor taken along plane XI—XI of FIG. 10.

Referring now to FIG. 1, the seat belt system of the present invention is generally shown. The reel 10 has seat belt webbing 20 wound therearound. The belt 20 terminates in a tongue plate 21, and the tongue plate is insertable into the buckle 30. The buckle corresponds to that described in application Ser. No. 253,168, filed May 15, 1972 by Hans Jakob entitled "Pushbutton Buckle." The buckle is attached to the vehicle by means of another belt 22 and an anchoring plate 23 which is secured to the vehicle. It should be recognized that the buckle 30 could be attached to the vehicle in other ways depending on the intended location of the buckle 30 and the location of the anchoring points for the anchoring plate 23 in the vehicle. The buckle 30 could be connected directly to an anchoring plate 23 or could be connected through a different intermediary than a belt, for example a flexible or rigid rod. Wires 37, 38, the function of which is described in detail below, emerge from the buckle to be connected in a manner set forth below. Of course, the wires do not have to be exposed but may be formed between a "sandwich" of webbing or may be internal to a protective cover. The buckle's location vis-a-vis the seat location and structure of the interior of the vehicle will determine how the wires 37, 38 are connected from the buckle 30.

The reel 10 generally comprises a housing 11 with upstanding sidewalls 12 and is connected to the vehicle through plate 16. The spool of the reel 13 is supported for rotation between the sidewalls 12, and the seat belt webbing 20 is wound around the shaft 17. A spring mechanism housed in housing 14 biases the reel to a retracted position so that the belt 20 will be fully wound around the reel.

The control system is generally housed in housing 80 and the contents therein will be explained in more detail hereinafter. The reel housing is mounted to the vehicle in a conventional manner by attaching the reel housing plate to the vehicle.

Locking means are movable between a locked position to prevent unreeling of the webbing from the reel to an unlocked position allowing unreeling of the webbing from the reel. In the exempalry embodiment, the locking means or locking pawl 40 generally comprises a pawl member 41 which is spring biased by leaf spring 42 to contact the teeth 19 on the sides of the side circular members or ratchet 18a, 18b of the shaft. The locking pawl comprises an elongated member 43 so that the pawl members 41 on each side of the reel work in unison. The locking pawl is pivotally mounted in the slots 44 in the sidewalls 12 of the reel housing. When the pawl member 41 is in the position shown in FIG. 8, it is engaging the teeth 19 of the ratchets 18a, 18b of the reel preventing the reel from rotating in the counterclockwise direction as shown in FIG. 8. However, when the locking pawl is in the position shown in FIG. 7, the pawl does not intersect the teeth 19 and the ratchets 18a, 18b are free to rotate in either direction so that the reel can be wound and unwound without interference from the locking means.

The locking means is maintained in its unlocked position in a number of ways. When the belt is completely wound around the reel, the diameter of the spool of webbing increases so that lever 45 (FIG. 1) which rests against the spooled webbing pivots in a counterclockwise direction. Lever 45 is connected to the locking pawl so that the movement of the lever 45 in a counterclockwise direction causes the locking pawl to be urged in a counterclockwise direction so that the locking pawl will not engage the teeth 19. Therefore, when the reel is in its fully wound state, lever 45 will prevent the locking pawl from engaging the teeth so that the belt can be unwound from the reel.

Blocking means moves between a blocking position to block the locking pawl from moving to its locked position. The blocking means may also move to an unblocking position to allow the locking means to move to its locked position. In the exemplary embodiment the blocking means 50 generally comprises a blocking disc 51 which is mounted for rotational movement in association with rotation of the slide member or ratchet 18a. Shaft 17 and ratchet 18a rotate upon protraction and retraction of the seat belt webbing. This rotation causes rotation of the pinion disc 71 and the pinion 72 which are connected to the shaft 17. Blocking disc 51 is held in frictional contact against the pinion disc 71 by a spring washer 52. See FIG. 3. The frictional contact causes rotation of the ratchet 18 to impart rotation to the blocking means.

Figure 7:
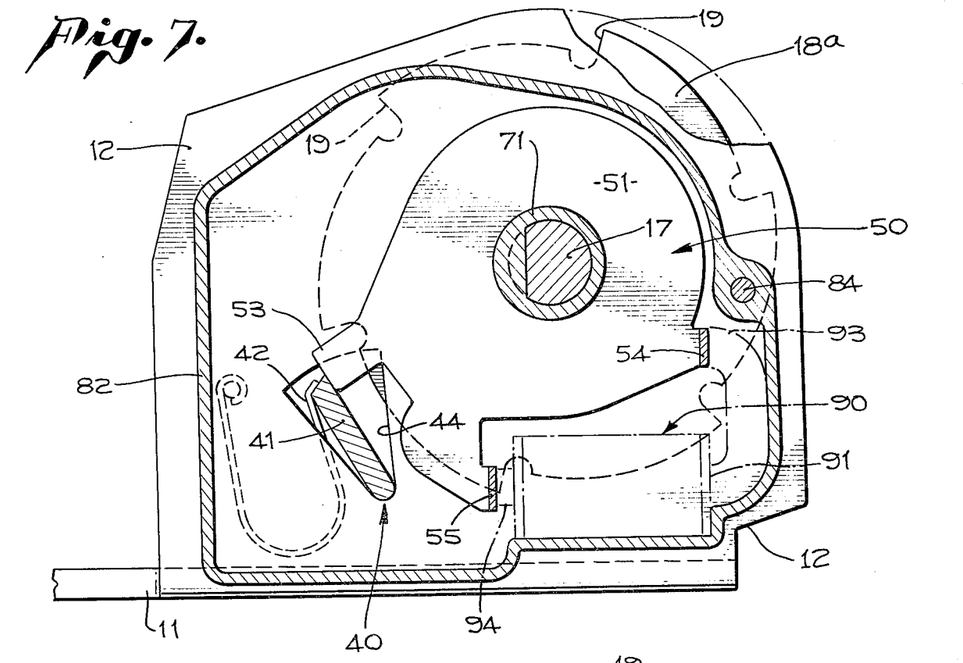
FIG. 7 is a cross-sectional view of the Free Pull Retractor especially indicating the blocking disc in its blocking position and is taken along plane VII—VII of FIG. 3.
Figure 8:
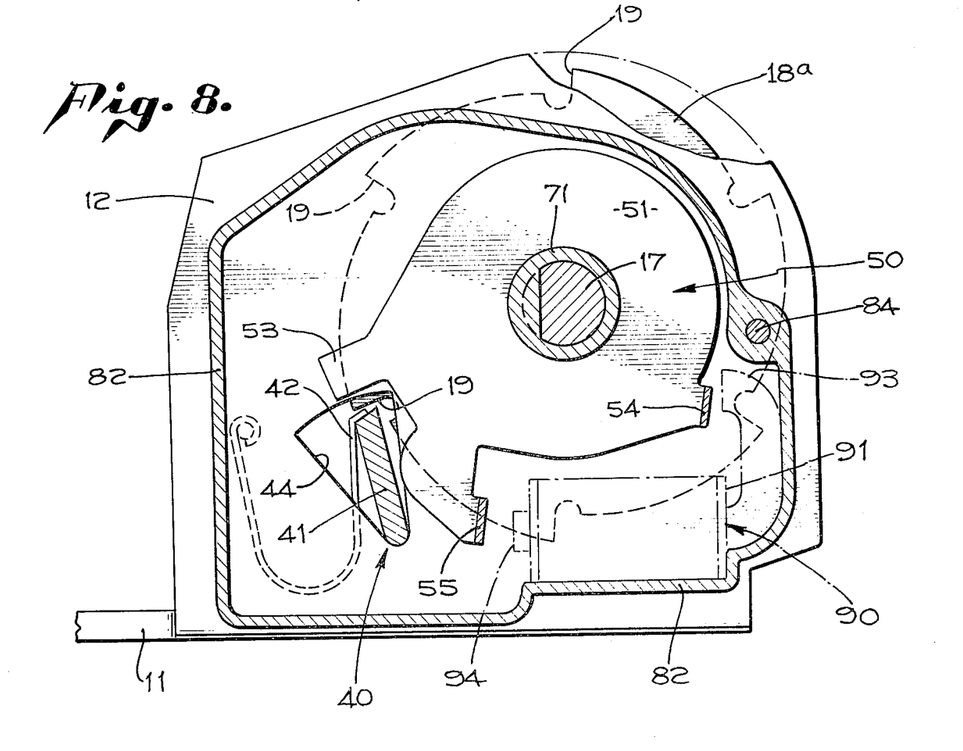
FIG. 8 is another cross-sectional view of the Free Pull Retractor similar to that shown in FIG. 7 except that the blocking disc is in its unblocking position.

The pawl blocking disc 51 is rotated in a counterclockwise direction to its position in FIG. 7 through protraction of the belt causing counterclockwise rotation of the pinion disc 71. Tab 55 of the blocking disc passes through slot 85 in the midwall 83, and the size of the slot determines the extremity of clockwide rotation of the blocking disc 51 so that the blocking disc 51 only rotates through a small angle between the position in FIG. 7 and that in FIG. 8. In the FIG. 7 position, arm 53 contacts the locking pawl 41 and prevents it from moving to its locked position contacting the ratchet.

Retraction of the belt, even through a small distance, causes sufficient rotation of the shaft 17 in a clockwise direction to rotate the blocking disc 51 in a clockwise direction as shown in FIG. 8. This rotation is sufficient to move the arm 53 on the unblocking disc to a position shown in FIG. 8 out of contact with the locking pawl 41. This frees the locking pawl so that it can move clockwise into the path of the teeth 19 on the ratchet wheel 18. See FIG. 8. In that position, the locking pawl prevents the ratchet wheel from counterclockwise rotation and, therefore, prevents the protraction of the seat belt webbing from the reel.

The blocking disc 51 is prevented from returning to its blocking position because the ratchet cannot rotate sufficiently counterclockwise to return the blocking disc to a blocking position and because the locking pawl 41 in its locked position contacts the arm 53 of the blocking disc 51 to prevent rotation of the disc. The locking pawl 41 maintains the FIG. 8 position until the webbing on the reel reaches a sufficient diameter to rotate lever 45 (FIG. 1) in a counterclockwise direction to rotate the pawl 41 therewith and away from the path of the ratchet 18a and the blocking disc arm 53.

Electrically operated means associated with the retractor holds the pawl blocking means against movement to the pawl release position while the electrically operated means is energized. In the exemplary embodiment, the electrically operated means preferably comprises electromagnetic means which holds the pawl blocking means in its blocking position on activation of the electromagnetic means whereby the reel is free to rotate in either direction until the seat belt is buckled. The electromagnetic means is deactivated when the buckle is buckled to release the blocking means to allow the locking pawl means to thereafter prevent protraction of the reel. In the exemplary embodiment, the electromagnetic means 90 includes a coil winding assembly 91 having an elongated core element 92 which extends a distance from the winding 91 and at one end terminates in a nominal south pole 93. The other end of the core element 92 extends a smaller distance from the windings and terminates in a nominal north pole 94. The shape of the electromagnetic means depends on its placement in the reel and the shape of the blocking disc 51.

In the exemplary embodiment, the blocking disc 51 has two tabs 54 and 55. When the blocking disc is rotated to its position in FIG. 7, the tabs 54 and 55 are moved into a position contacting the poles of the electromagnet 93 and 94 respectively. When the electromagnet is activated, the magnetic force holds the tabs 54 and 55 against the core element to prevent clockwise rotation of the blocking disc 54. As states above, the initial rotation of the shaft from protraction of the seat belt had caused the unblocking disc 51 to assume the position shown in FIG. 7. In that position, the tabs 54 and 55 are against the core of the electromagnet. As long as the electromagnet remains activated and attracting the tabs of the blocking disc 51, the blocking disc will not rotate in a clockwise direction during retraction of the seat belt. As explained in more detail below, the electromagnetic means 90 will remain in its activated state until the seat belt is buckled. Therefore, any retraction of the seat belt prior to buckling will not rotate the blocking disc 51 to its inactive position (FIG. 8) so that until the buckle is buckled, the locking pawl 41 will not be able to move to its locking position against the teeth 19 of the ratchet 18.

The use of both poles of the electromagnet allows twice the magnetic force acting on the blocking disc from the same amount of current. In addition, a magnetic circuit (not an electrical circuit) is maintained through the coil element and the tabs and through the blocking disc. This yields even greater forces and insures that the electromagnet will securely hold the blocking means in the FIG. 7 position.

Electrical circuit means are provided for energizing the electrically operated means upon an initial protractive movement of the reel and for de-energizing the electrically operated means upon connection of the buckle parts. In the exemplary embodiment, the electrical circuit means includes sensing means which senses when the seat belt is buckled to deactivate the electromagnet. In the preferred embodiment, the sensing means is mounted in the buckle 30 and includes a switch 31 which senses when the tongue plate 21 is inserted in the buckle 30. Switch 31 is normally closed (FIGS. 2 and 11) so that that spring contact 32 is against the contact 33. Insertion of the tongue plate 21 into the buckle 30 pushes lever 34 downwardly in FIG. 9. As best seen in FIG. 10, the lever 34 has an outward projection 35 which engages the spring contact 32 so that downward movement of the lever 34 causes corresponding downward movement in the spring contact 32 to separate contact 32 from the contact 33 and open the circuit.

Wires 36 and 37, which connect to the voltage system and the reel electromagnet of the vehicle are attached to the switch contacts 32 and 33 by means of suitable fastners 38. (FIG. 10 and 11). Voltage from the vehicle battery or other voltage source (FIG. 2) causes a current to pass through lead 36, the normally closed switch 31 and through wire 37 to contact 95 of the electromagnet.

The electrical circuit means which also energizes the electrically operated means upon an initial protractive movement of the reel includes, in the exemplary embodiment, a normally open switch means 60 associated with the retractor which is closed by an initial protractive movement of the reel. In the exemplary embodiment, the normally open switch means operates as set forth below and includes means associated with the reel to sense the initial protraction of the belt from the reel.

Figures 4, 5, 6:
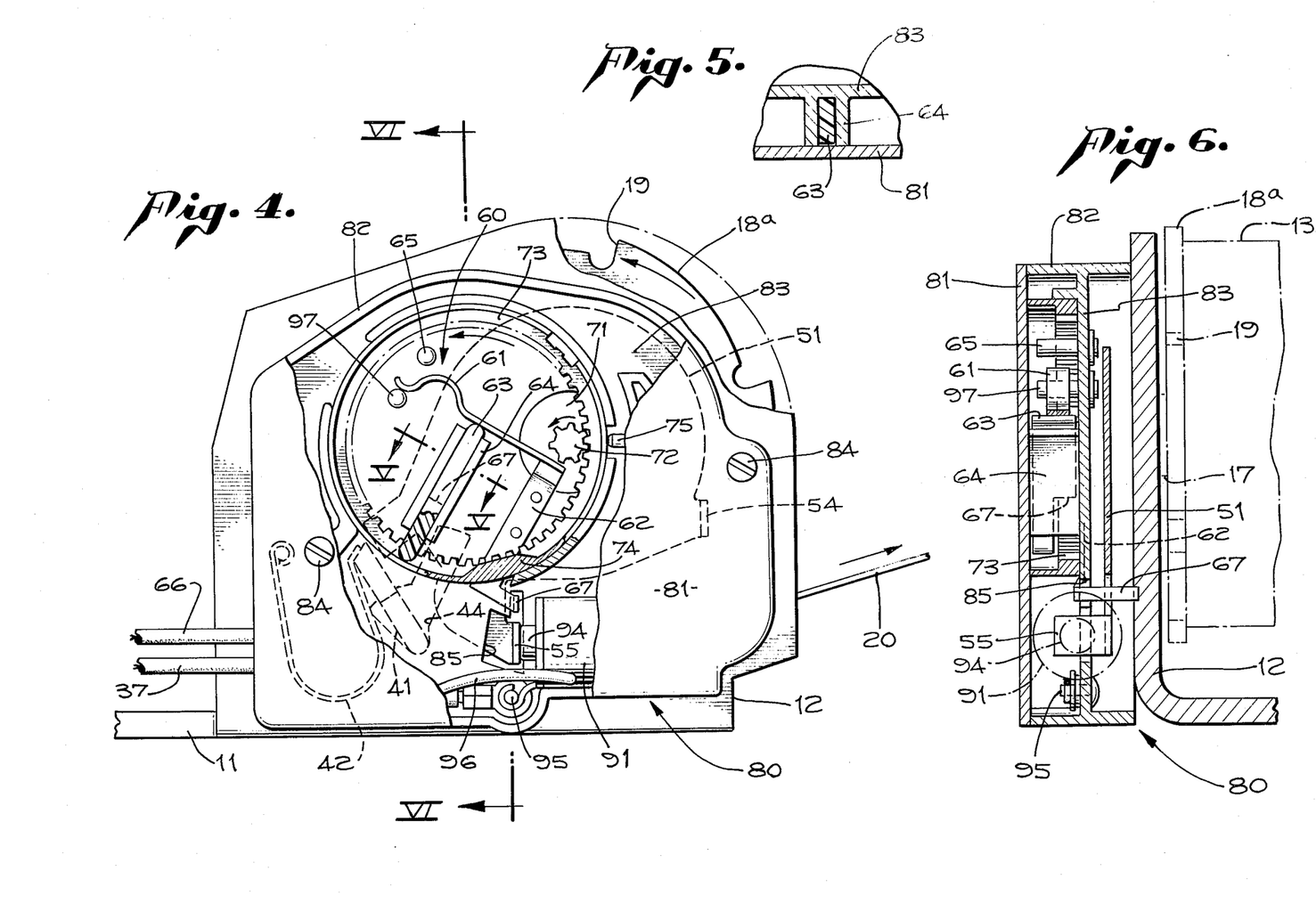
FIG. 4 is a cross-sectional view of the Free Pull Retractor after the belt has been pulled somewhat therefrom.
FIG. 5 is a cross-sectional view taken along plane V—V in FIG. 4.
FIG. 6 is a cross-sectional view taken along plane VI—VI of FIG. 4.

The normally open switch includes spring switch 61 which is movable between its normally open position against contact 65 (FIG. 2) to a closed position against contact 97 (FIG. 4). The movement of spring switch 61 is as follows.

Rotation of the shaft 17 in a counterclockwise direction due to protraction of the seat belt causes the pinion 72 to also rotate in a counterclockwise direction. The rotation of pinion 72 imparts a corresponding rotation to the internal ring gear 73. See the arrows in FIG. 4. When the seat belt is in its fully retracted position, the pinion disc is in a position shown in FIG. 2. Extending inwardly on ring gear 73 is a cam face 74. In the position in FIG. 2, the fully retracted position, the cam face 74 pushes the follower 63 against the spring contact 61. The follower 63 is held in a follow holder 64 to allow only sliding movement of the follower. The follower 63 has a notch 67 which intersects with mating structure on the follower holder to prevent the follower from falling from the holder when cam face 74 is not pushing on the follower.

Locating means 75 insure that the cam face 74 is correctly positioned against the follower 63 when the seat belt is in its fully retracted position. Upon the initial use of the seat belt system, the first protraction of the seat belt and corresponding rotation of the internal ring gear 73 causes the locating means 75 to break away from the ring gear 73 to which it had been attached. A more complete discussion of the locating means 75 is set forth in U.S. Pat. No. 3,767,134 to Morales.

The rotation of the pinion 72 and ring gear 73 causes the cam face 74 to move out of contact with the follower 63. As shown in FIG. 4, this causes the follower 63 to move downward under the urging of the spring switch 61 so that the spring switch engages contact 97 to complete the circuit from the battery through the electromagnet through lead 96 and spring switch 61 to ground.

In operation, when the seat belt is fully retracted, the cam face 74 pushing against the follower 63 causes the spring switch 61 to be out of engagement with the contact 97. Therefore, when the belt is in its fully retracted position, the electromagnet is deactivated. Deactivation of the magnet is beneficially in the fully retracted state because there is no need to have the electromagnet using battery power when the seat belt is not in use. However, when the seat belt is initially protracted from the reel, the downward movement of the follower 63 under the urging of spring switch 61 allows the spring switch to move into contact with contact 97 to activate the electromagnet.

The initial protraction also rotates the blocking disc 51 so that tabs 54, 55 are brought into contact with the poles of the electromagnet and are held thereagainst by magnetic energy. As long as the electromagnet remains activated, the blocking disc 51, held in the FIG. 7 position by the electromagnet, prevents the locking pawl 41 from locking the ratchet 18. In other words, both protraction and retraction of the belt are allowed as long as the electromagnet is holding the blocking means in its blocking position.

When the buckle is buckled, normally closed switch 31 is opened. This breaks the circuit from the battery to the electromagnet and deactivates the electromagnet. When the belt is buckled, the reel pulls in any excess belt and causes clockwise rotation of the ratchet. This clockwise rotation likewise imparts a clockwise rotation to the blocking disc 51. The slight rotation disengages the locking pawl 41 from the arm 53 of the blocking disc 51 so that the locking pawl is free to engage the teeth 19 of the ratchet. The engagement of the teeth prevents further protraction of the belt from the reel so that the belt securely holds the occupant of the vehicle.

The interlock system is so designed that if a passenger seat is occupied in the vehicle, the seat must first be occupied, then the belt must be protracted, then and only then does the ignition interlock circuit allow the engine of the vehicle to be started. Any deviation from this sequence will prevent engine activation. Means in the interlock circuit which are not part of the instant invention are provided to sense seat occupancy.

The means associated with the reel which senses the initial protraction of the belt from the reel also has a secondary function. When the belt is fully retracted, the cam face 74 pushes the follower 63 upward against the bias of the spring switch 61, and this causes the spring switch to engage contact 65 which carries current from the battery through the ignition interlock and through wire 66. As mentioned above, switch 61 leads to plate 62 which is grounded so that current will flow from the battery to ground through the ignition interlock circuit to ground. The ignition interlock circuit is adapted to sense the opening of the circuit to indicate that the belt is being used. The safety feature of the ignition interlock circuit cannot be defeated by reeling the seat belt, starting the car, and then allowing the seat belt to be retracted because complete retraction of the seat belt will cause the cam face 74 to again assume its position in FIG. 2 and cause the spring switch 61 to disengage contact 65. The interlock circuit is adapted to sense this action and cause a loud buzzing sound to be emitted to warn of non-use of the belt. The sound is very annoying and continues until the belt is protracted from the reel.

Figure 2:
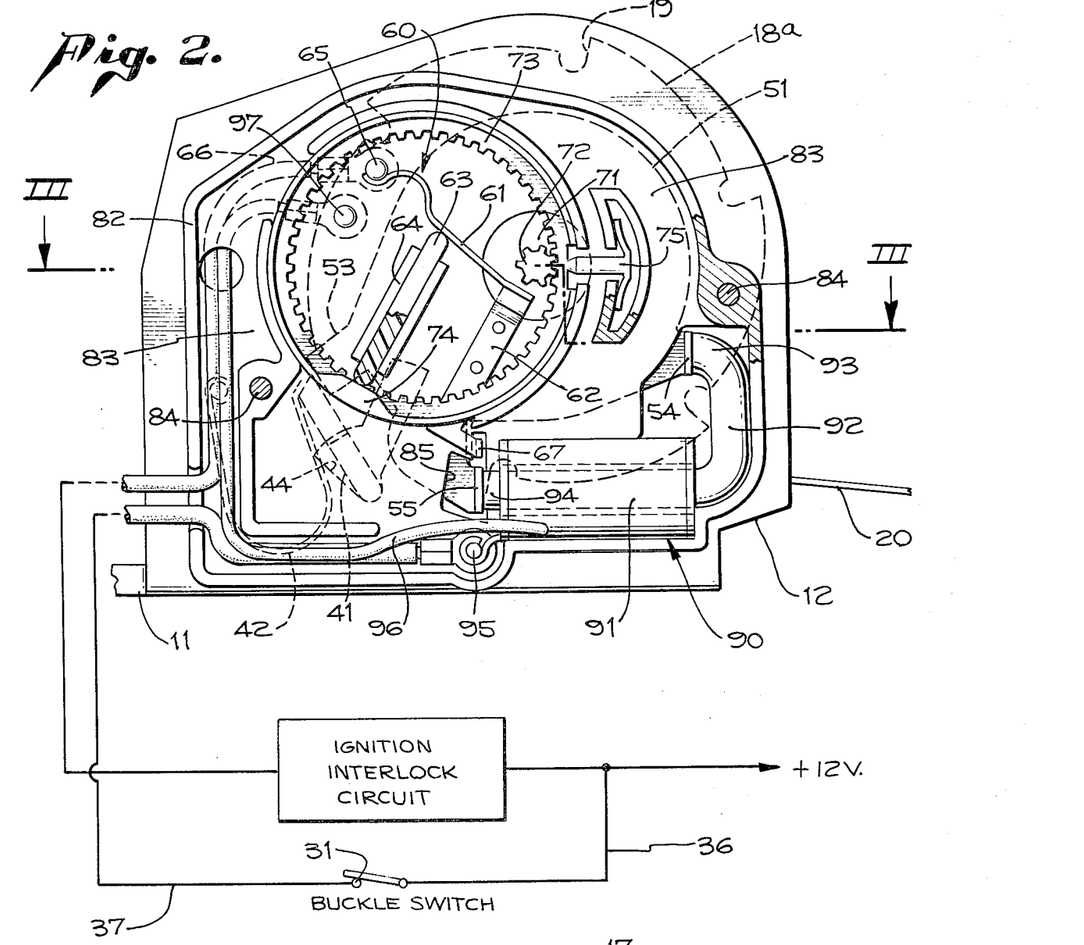
FIG. 2 is a cross-sectional view of the preferred embodiment of the Free Pull Retractor taken along plane II—II of FIG. 1.

In operation, the reel assumes an initial configuration shown in FIG. 2. At that point, the belt is fully retracted on the reel, and switch 31 on the buckle is in its normally closed position. As the belt begins to be unreeled from the reel, the device assumes the position shown in FIG. 4, and the spring switch 61 moves away from contact 65 to signal the interlock system that initial retraction has taken place. In FIG. 4, the switch 61 engages contact 97 which completes the circuit from the battery to ground through the electromagnet. The initial counterclockwise movement of the shaft 17 due to the belt being unwound, causes the blocking disc 51 to also rotate in a counterclockwise direction until tabs 54 and 55 contact the poles 93 and 94 of the electromagnet core 92. The initial protraction of the belt also causes the switch 61 to engage contact 97 to activate the electromagnet. Because the initial rotation of the blocking disc had moved the tabs 54 and 55 into engagement with the magnet poles, the magnet will continue to hold the blocking disc in the position shown in FIG. 7.

Referring now to FIG. 4, spring switch 61 is engaging contact 97 so that current flows from contact 97 through switch 61 to plate 62. Plate 62 is connected to electrical ground by the extension 67 of plate 62, which passes through slot 85 to connect with sidewall 12 which is grounded to the vehicle body to complete the circuit from the battery. Spring switch 61 assumes its FIG. 4 position against contact 97 when the belt is unreeled from the reel in a manner set forth below. It should be noted at this point that switch 31 must be in its closed position and spring switch 61 must be against contact 97 in order for the electromagnet to operate.

As long as the electromagnet continues to hold the blocking disc in the FIG. 7 position, the blocking disc prevents locking pawl 41 from engaging the teeth of the ratchet 18. Therefore, the belt can be protracted and retracted at will, without interference from the locking pawl.

However, when the seat belt is buckled, switch 31 opens which cuts off current to the electromagnet so that the blocking disc 51 is free to rotate with rotation of the pinion disc 71. The retraction caused by the removal of tension on the belt after it is buckled causes the blocking disc to rotate in a clockwise direction to assume the position shown in FIG. 8. In that position, the locking pawl is released from contact with arm 53 of the blocking disc and engages the teeth of the ratchet to prevent counterclockwise rotation of the ratchet and protraction of the belt.

Figure 3:
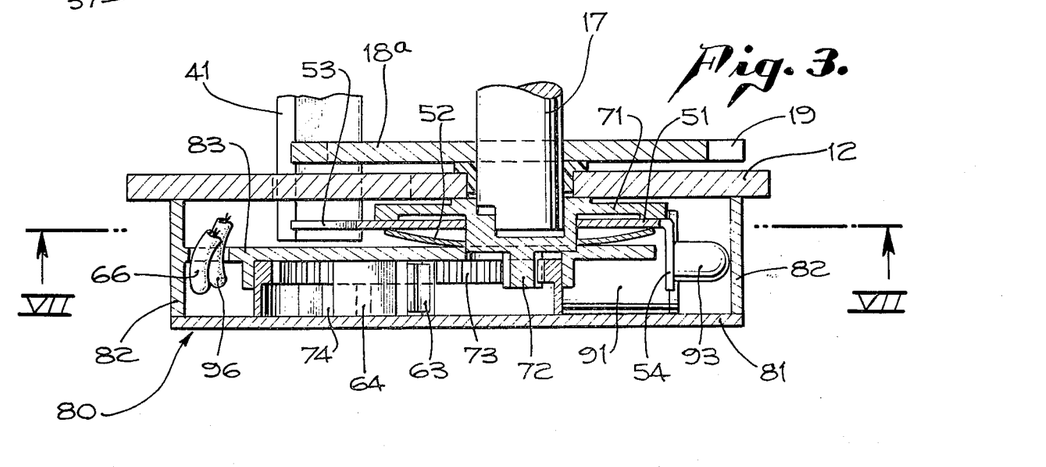
FIG. 3 is a cross-sectional view of the Free Pull Retractor taken along plane III—III of FIG. 2.

The mechanism is extremely compact and fits within housing 80 which is attached to the sidewall 12 of the retractor reel. The housing 80 comprises a front wall 81 and sidewalls 82. Midwall 83 is generally centrally located within the housing 80 and is generally parallel to the front wall 81. Midwall 83 serves as a support for certain of the elements as shown in FIGS. 3 and 6. Housing 80 is attached to the sidewall 12 by means of screws 84 or other fastening means. Thus, a seat belt system has been shown which overcomes the difficulty of prior art devices. Specifically, a free-pull retractor is provided so that the seat belt is free to be pulled from the reel, released back on the reel and yet free to be pulled further from the reel at least until the buckle is connected. The switch system which is part of the free pull system also indicates to the interlock or warning system tha the belt has been protracted from the reel. The system is low cost and very reliable.

In summary, a seat belt retractor system for use in a vehicle includes a reel 10 and seat belt webbing 20 wound thereon. A first buckle means 21 is attached to the webbing for connection to a second buckle means 30. First switch means or normally open switch 60 is operated by unwinding movement of the reel and second switch means or normally closed switch 31 is operated by connection of the buckle means. Locking means 41 is movable between a locked position to prevent unreeling of the webbing from the reel. Blocking means 50 is movable between a blocking position to block the locking means from moving to its locked position and is movable to an unblocking position to allow the locking means to move to its locked position.

This seat belt retractor system has been improved by the provision of an electrically operated control means 90 actuated by the first switch means to hold the blocking means in its blocked position until the electrically operated control means is deactivated by the second switch means upon the first and second buckle means being connected together to release the blocking means. Cam means 74 move in response to rotation of the reel, and follower means 63 is movable in response to movement of the cam means. The first switch means 60 is closed when the webbing is in a fully retracted state and is held in its closed position by the follower. When webbing is protracted from the reel, the cam means is moved away from the follower so that the follower does not push on the first switch means and the first switch means opens. The blocking means 50 is rotatably mounted in association with the reel whereby protractive rotation of the reel urges the blocking means into its blocking position adjacent the electromagnet. The electromagnet when actuated holds the blocking means in its blocking position. The electromagnet has a north and south magnetic pole 93, 94 and means 54, 55 are on the blocking means to engage both poles.

I claim:

1. A seat belt retractor comprising:
   reel means for winding seat belt webbing therearound and reel locking pawl means movable between a first position whereby said pawl means permits unreeling of said webbing and a second position preventing unreeling;
   blocking means associated with said reel movable between a blocking position whereby it prevents said locking pawl means from moving to its second position and an inactive position permitting said locking pawl means to move to its second position;
   electromagnet means to hold said pawl blocking means in its blocking position on activation of said electromagnet means whereby said reel is free to reel and unreel until said seat belt is buckled, said electromagnet means when deactivated releasing said blocking means on said buckling to allow said locking pawl means to thereafter prevent unreeling of said reel; and
   sensing means to sense when said seat belt is buckled and to deactivate said electromagnet.

2. The device of claim 1 further including switch means associated with a source of electrical current and said electromagnet means and responsive to initial unreeling of said seat belt to activate said electromagnet on an initial protraction of said belt.

3. In a seat belt retractor system for use in a vehicle including:
   a. a reel and seat belt webbing wound therein;
   b. first buckle means attached to the webbing for connection to second buckle means;
   c. first switch means operated by unwinding movement of said reel and second switch means operated by connection of said buckle means;
   d. locking means movable between a locked position to prevent unreeling of said webbing from said reel, and to an unlocked position allowing unreeling of said webbing from said reel;
   e. blocking means movable between a blocking position to block said locking means from moving to its locked position, said blocking means being movable to an unblocking position to allow said locking means to move to its locked position, the improvement comprising the provision of:
   electrically operated control means activated by said first switch means to hold said blocking means in its blocking position until deactivated by said second switch means upon said first and second buckle means being connected together to release said blocking means.

4. The improved device of claim 3 further including the provision of:
   1. said reel means including cam means moving in response to rotation of said reel;
   2. follower means movable in response to movement of said cam means;
   3. said first switch means being closed when the webbing is in a fully retracted state and held in the closed position by said follower, said cam means being moved away from said follower when the webbing is protracted from said reel so that said follower does not push on said first switch means, and said first switch means opens.

5. The improved device of claim 3 further including the provision of:
   1. said blocking means being rotatably mounted in association with said reel means whereby protractive rotation of said reel means urges said blocking means into its blocking position, said blocking position being adjacent said electromagnetic means whereby said electromagnetic means when activated holds said blocking means in its blocking position.

6. The improved device of claim 5 further including the provision of:
   said electromagnetic means having north and south magnetic poles and means on said blocking means to engage both of said poles.

7. In a safety belt assembly including a safety belt, associated connectable buckle parts and a belt retractor having a belt windup reel, reel locking pawl and pawl blocking means movable to a pawl release position by a slight retractive movement of the reel, the provision of:
   electrically operated means associated with said retractor for holding said pawl blocking means against movement to said pawl release position while energized; and
   electrical circuit means for energizing said electrically operatted means upon an initial protractive movement of said reel and for de-energizing said electrically operated means upon connection of said buckle parts.

8. The provision in a safety belt assembly of claim 7 wherein:
   said electrical circuit means includes a normally open switch means associated with said retractor and which is closed by an initial protractive movement of said reel.

9. The provision in a safety belt assembly of claim 8 wherein:
said electrical circuit means includes a normally closed switch means associated with said buckle parts and which is opened on connection of unit buckle parts.

10. In a safety belt retractor for adjustably anchoring a safety belt having associated releasably connectable buckling means, said retractor including a belt windup reel, a reel locking pawl and pawl blocking means urged by unwinding movement of the reel toward a pawl blocking position and by winding movement of the reel toward a pawl release position, the improvement comprising the provision of:
control means for maintaining said blocking means in said pawl blocking position, against urging toward said pawl release position by winding movement of the reel while said releasable buckling means is in a released position.

* * * * *

UNITED STATES PATENT OFFICE
CERTIFICATE OF CORRECTION

Patent No. 3,890,003  Dated June 17, 1975

Inventor(s) Albert R. Close

It is certified that error appears in the above-identified patent and that said Letters Patent are hereby corrected as shown below:

Column 3, line 54 change "exempalry" to - - exemplary - -.
Column 4, line 25 change "slide" to - - side - -. Column 5, line 30 change "54" to - - 51 - -; same line, change "states" to - - stated - -. Column 8, line 53, the word "Thus" should begin a new paragraph. Column 10, in Claim 7, line 60 change "operatted" to - - operated - -.

Signed and Sealed this thirtieth Day of December 1975

[SEAL]

Attest:

RUTH C. MASON
Attesting Officer

C. MARSHALL DANN
Commissioner of Patents and Trademarks